(12) United States Patent
Gratton et al.

(10) Patent No.: US 10,440,422 B2
(45) Date of Patent: Oct. 8, 2019

(54) SYSTEMS, METHODS AND APPARATUS FOR STRUCTURING AN ELECTRONIC PROGRAM GUIDE ASSOCIATED WITH MULTIPLE DEVICES

(71) Applicant: Dish Network L.L.C., Englewood, CO (US)

(72) Inventors: Max Stephen Gratton, Parker, CO (US); Mark Templeman, Parker, CO (US); Danny Jean Minnick, Castle Rock, CO (US)

(73) Assignee: DISH NETWORK, L.L.C., Englewood, CO (US)

( * ) Notice: Subject to any disclaimer, the term of this patent is extended or adjusted under 35 U.S.C. 154(b) by 0 days.

(21) Appl. No.: 15/858,346

(22) Filed: Dec. 29, 2017

(65) Prior Publication Data

US 2019/0208260 A1   Jul. 4, 2019

(51) Int. Cl.
| | |
|---|---|
| *H04N 21/433* | (2011.01) |
| *H04N 5/445* | (2011.01) |
| *H04N 21/458* | (2011.01) |
| *H04N 21/435* | (2011.01) |
| *H04N 21/431* | (2011.01) |

(52) U.S. Cl.
CPC ..... *H04N 21/4334* (2013.01); *H04N 5/44543* (2013.01); *H04N 21/4332* (2013.01); *H04N 21/4583* (2013.01); *H04N 21/431* (2013.01); *H04N 21/433* (2013.01); *H04N 21/435* (2013.01); *H04N 21/4331* (2013.01); *H04N 2005/44547* (2013.01); *H04N 2005/44565* (2013.01)

(58) Field of Classification Search
None
See application file for complete search history.

(56) References Cited

U.S. PATENT DOCUMENTS

| | | | | |
|---|---|---|---|---|
| 2003/0233241 A1* | 12/2003 | Marsh | ............... | G06F 17/30038 725/14 |
| 2012/0131605 A1* | 5/2012 | Aoki | .................. | H04N 5/44543 725/27 |
| 2014/0181868 A1* | 6/2014 | O'Callaghan | ...... | H04N 21/4821 725/39 |

* cited by examiner

*Primary Examiner* — Justin E Shepard
(74) *Attorney, Agent, or Firm* — Perkins Coie LLP

(57) ABSTRACT

Embodiments described herein are directed at apparatus, systems and methods generally related to satellite, cable or other television receiver/DVR video systems for structuring a centralized content-processing device and/or its associated EPG in facilitating delivery and recording of audiovisual content when the centralized content-processing device is associated with multiple remote content-processing devices. In one implementation, a centralized content-processing device may create device-specific folders for the centralized content-processing device and one or more remote devices. The device-specific folders may, for example, include information for one or more programming events associated with content (e.g., TV shows, sports, movies, music, documentaries). In some embodiments, the device-specific folders for the remote content-processing devices are logically separated from one another in a manner such that a remote device is restricted access to the device-specific folder for the remote device.

21 Claims, 6 Drawing Sheets

| DATE | TIME | DEVICES / CONTENT NAME | | | |
|---|---|---|---|---|---|
| | | Family Room Device 304 | Bed Room 1 Device 306 | Bed Room 2 Device 308 | Bed Room 3 Device 310 |
| Sept 3, 2017 | 9:30 PM | | | | |
| Dec. 25, 2017 | 5:00 PM | King Arthur | CSI | CSI | |
| Feb 5, 2018 | 6:00 PM | Superbowl | Superbowl | | |

Filter by Device 312

*FIG. 3*

SYSTEMS, METHODS AND APPARATUS FOR STRUCTURING AN ELECTRONIC PROGRAM GUIDE ASSOCIATED WITH MULTIPLE DEVICES

BACKGROUND

Content-processing devices, such as set-top boxes for satellite and cable television services, allow a user to view content information on an Electronic Program Guide (EPG). The content information typically includes a list of content (and corresponding television channels or other content sources) that are available for viewing during different time slots. The content information also includes details of the content, such as duration, estimated start and end times, a synopsis of the content, information about the participants or the cast associated with the content. The EPG may be displayed on a presentation device, such as a television, coupled to a content-processing device.

In some environments, multiple content-processing devices may be deployed at a geographical location for delivering content, e.g., multiple content-processing devices installed in different rooms of a home. In such environments, a content-processing device can operate as a centralized device that receives requests from other content-processing devices. For example, a remote device may request a centralized device to record content. Consequently, the centralized device and/or its associated EPG needs to be structured to handle a flood of recording requests from multiple devices and/or multiple content, and associated resource conflicts between/among various recording requests.

SUMMARY

Embodiments directed at systems, methods, and apparatus for structuring a centralized content-processing device (alternatively termed herein as "central device") and/or its associated EPG in facilitating delivery and recording of audiovisual content when the central device is associated with multiple remote devices. The central device and the remote devices can be content-processing devices (of the same type or different types) associated with display, presentation, distribution, redistribution, recording, or otherwise any suitable processing of content.

The method includes a central device establishing network connectivity with a remote device, creating device-specific folders for the central device and the remote device, receiving event information corresponding to a recording event from the remote device, storing the event information in the device-specific-folder for the remote device, generating a central device electronic program guide (EPG) based on the device-specific folder for the central device and the device-specific folder for the remote device, in response to a request by the remote device to access the central device EPG, the central device preventing the remote device from accessing the central device EPG, and providing the central device EPG on a display communicatively coupled to the central device. The device-specific folder for the remote device is associated with a remote device EPG. The logically separated device-specific folders on the central device are configured to: (i) provide, to the central device EPG, access of the at least one remote device EPG without modification of the at least one remote device EPG; (ii) provide, to the central device EPG, access and modification of the central device EPG, and/or (iii) manage the ability of a user on the at least one remote device to delete or modify a timer.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3 illustrates an example of a central device EPG generated by a central device.

DETAILED DESCRIPTION OF THE DRAWINGS

Figure 1:
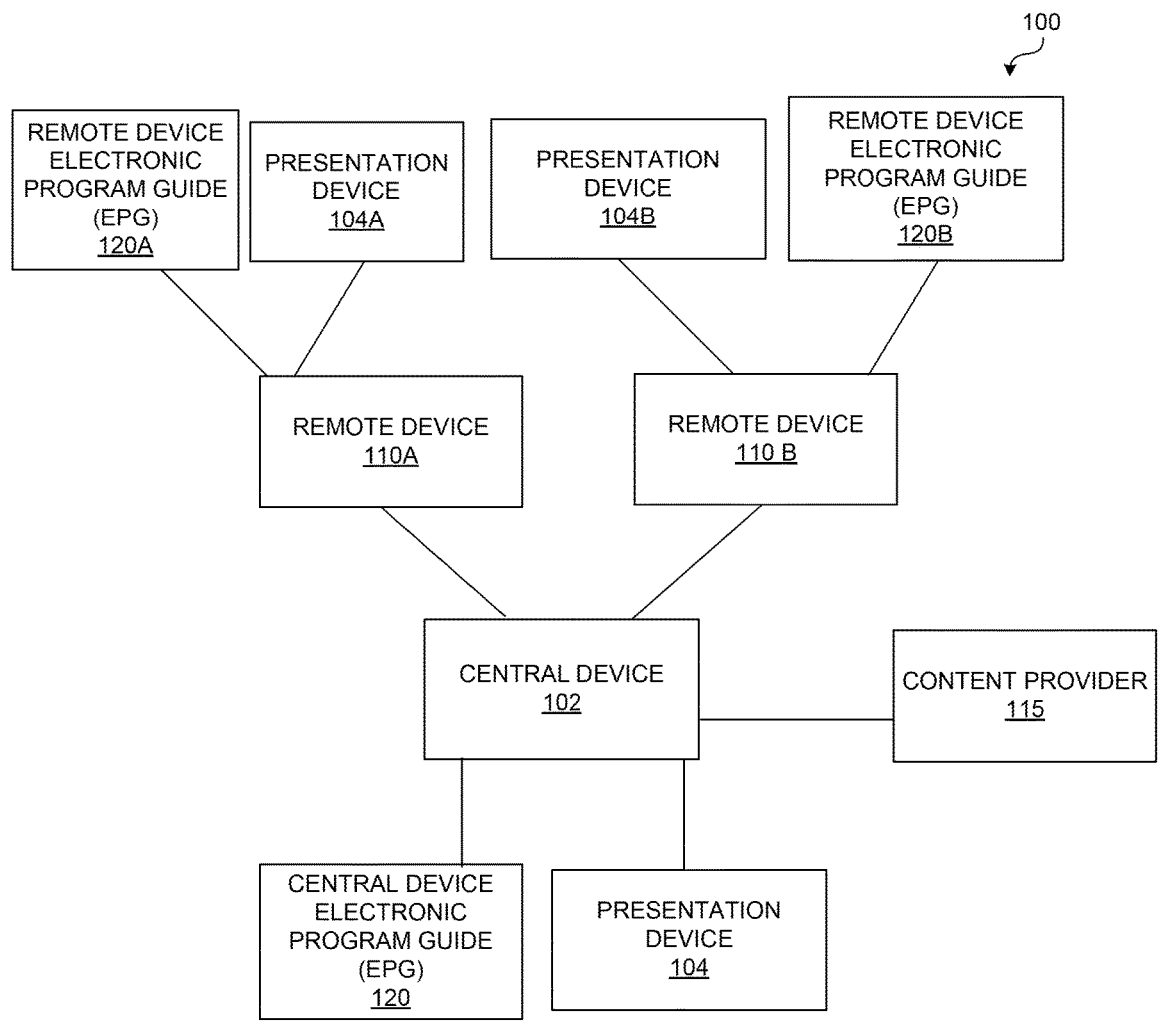
FIG. 1 illustrates an environment of operation of a central device.

The following detailed description of the invention is merely exemplary in nature and is not intended to limit the invention or the application and uses of the invention. Furthermore, there is no intention to be bound by any theory presented in the preceding background or the following detailed description.

Embodiments directed at systems, methods, and apparatus for structuring a centralized content-processing device (alternatively termed herein as "central device") and/or its associated EPG in facilitating delivery and recording of audiovisual content when a central device is associated with multiple remote devices. The central device and the remote devices can be content-processing devices (of the same type or different types) associated with display, presentation, distribution, redistribution, recording, or otherwise any suitable processing of content.

The various embodiments described herein generally provide apparatus, systems and methods related to satellite, cable or other video recording systems for structuring a central device and/or its associated EPG in facilitating delivery and recording of audiovisual content where a central device is associated with multiple remote devices. In one embodiment, a central device creates at the central device one or more device-specific folders for the central device and one or more remote devices. In an embodiment, the one or more device-specific folders include information about content (e.g., one or more programming events, such as TV shows, sports, movies, music, documentaries) associated with the central device and one or more remote devices. In some embodiments, the device-specific folders for the central device and the at least one remote devices are logically separated from one another in a manner such that a remote device is only allowed access to its device-specific folder. A device-specific folder may be in the form of a directory, storing a file or portions of a file. In some embodiments, a device-specific folder may be in the form of a database or a data store that logically separates different pieces of data. As an example, a first device-specific folder may comprise a list of timers set by a user of a central device, whereas a second device-specific folder may comprise a list of timers set by a user of a remote device.

In some scenarios, a remote device may be a device with limited storage capability and may include a client application. Thus, such a remote device may not have a capability for recording content. On the other hand, a central device may be a terrestrial ("over-the-air") television receiver, a cable television receiver, a satellite television receiver, an Internet connected television or television receiver, a computer, a portable electronic device, or the like. In such scenarios, a remote device may request a central device to schedule a recording of content. The remote device may, for example, send event information corresponding to a recording event of the content to the central device. The device-specific folders generated by the central device may be used in these scenarios to restrict access between certain remote devices, such that a remote device is restricted from accessing content for other remote devices and/or the central device itself. For example, the information corresponding to the recording event may be added into the device-specific-folder for the at least one remote device. In some embodiments, the device-specific folders on the central device may restrict a user's ability to modify, delete, or otherwise change the priority of timers set by another device. (The "another" device may be a remote device or the central device itself.) In some embodiments, a central device generates a central device EPG showing a device-specific folder for the central device and the device-specific folders for one or more remote devices. For example, the central device EPG may display the device-specific folders for remote device(s) separate from one another such that the remote device is restricted to accessing only the device-specific folder for the remote device. In some embodiments, the central device EPG may display only the content (e.g., pre-recorded content, content that is contemporaneously recorded, or content scheduled to be recorded in future) associated with the central device or a remote device. In some implementations, the central device EPG allows a user to switch between separate displays showing the scheduled recording events associated with the central device and/or the connected remote devices. The device-specific folder for the device is associated with a remote device EPG. In some embodiments, the logically separated device-specific folders on the central device are configured to: (i) provide, to the central device EPG, access of the at least one remote device EPG without modification of the at least one remote device EPG; (ii) provide, to the central device EPG, access and modification of the central device EPG, and/or (iii) manage the ability of a user on the at least one remote device to delete or modify a timer.

In at least one embodiment, content stored or accessible at the central device and/or remote device may be formatted as an audiovisual stream. Exemplary audiovisual stream formats include Motion Picture Experts Group (MPEG) standards and the like. It is to be appreciated that the audiovisual stream may be supplied by any source, such as an over-the-air broadcast, a satellite, or cable television distribution system, a digital content provider, the Internet or other communication networks, and the like. In at least one embodiment, the audiovisual stream may be associated with other supplemental data that includes text data, control data, timing information, and closed captioning data or subtitles.

Further, an audiovisual stream may be accessible and/or delivered by a transmission method, such as broadcast, multicast, simulcast, closed circuit, pay-per-view, on-demand, over-the-top (by "streaming," file transfer, or other means), or other method(s). Additionally, the audiovisual stream may be transmitted by way of any communication technology, such as by satellite, wire or optical cable, wireless, or other means. The audiovisual stream may also be transferred over a type of communication network, such as the Internet or other wide area network, a local area network, a private network, a mobile communication system, a terrestrial television network, a cable television network, and/or a satellite television network.

FIG. 1 illustrates an environment 100 of operation of a central device in facilitating delivery of audiovisual content when the central device is associated with multiple remote devices. The system of FIG. 1 is operable for delivery of audio visual content to users operating remote devices in multiple rooms or floors of a premises, e.g., in a household, a mall, a hotel, a restaurant, or any other facility. The system 100 includes a central device 102 coupled to remote devices 110A, 1106, presentation device 104, and content provider 115. Central device 102 is associated with generating and displaying an electronic program guide (EPG) 120 (also referred to herein as a central device EPG) that provides information for one or more programming events, such as pre-recorded content, content that is contemporaneously recorded, or content scheduled to be recorded in future. Remote devices 110A, 1106 are coupled to their associated presentation devices 104A, 1046 respectively. Remote devices 110A, 1106 are also associated with respective remote device EPGs 120A, 120B.

For example, in a household environment, central device 102 and presentation device 104 may be located in the main living room. In some embodiments, EPG 120 may be in the form of a grid of programs sorted by time and/or channel. In at least one embodiment, EPG 120 may display a list of timers, sorted by various criteria, such as channel, date, time, length of program, priority, or device originating the recording command. Remote device 110A and presentation device 104A may be located in the first bedroom. Remote device 1106 and presentation device 104B may be located in the second bedroom. Furthermore, central device 102 can create and store device-specific folders for central device 102 and each remote device 110A, 1106. In some embodiments, the device-specific folders on central device 102 are logically separated such that the each remote device 110A, 110B is restricted to accessing and/or modifying only the device-specific folder for itself.

Content information associated with the content may be provided by the content provider 115, or by another media source. Content provider 115 provides audiovisual streams of content to a distributor and/or to the central device 102. Content provider 115 may utilize one or more distribution networks to transmit the content to the central device 102. Examples of content providers 115 may include a cable company, a satellite broadcasting company, a television network, an on-demand media streaming service, a pay-per-view media streaming service, and/or an over-the-top media streaming service.

The content may include audio data, video data, and other data (e.g., advertising data). In one embodiment, the video data includes a series of digital frames, or single images to be presented in a serial fashion to a user. Similarly, the audio data may be composed of a series of audio samples to be presented in coordination with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized.

Central device 102 may access content and/or content information in various ways. For example, the central device 102 may access a television channel by demodulating and decrypting an audiovisual stream from a content provider 115. The central device 102 may access an over-the-top media streaming service by logging into a remote server and downloading and/or streaming the content over a communication network.

The communication network may be any network capable of transmitting audiovisual events and/or content information. Exemplary communications networks include over-the-air, satellite, and cable television networks, as well as wireless communication networks, public switched telephone networks (PSTN), local area networks (LAN), and wide area networks (WAN) providing data communication services and/or Internet access. The communication network may utilize any desired combination of wired (e.g., cable and fiber) and/or wireless (e.g., cellular, satellite, microwave, and radio frequency) communication mediums and any desired network topology (or topologies when multiple mediums are utilized).

The central device 102 of FIG. 1 may be any device capable of receiving audiovisual streams of sporting events from the content provider 115. For example, in the case of the content provider 115 being a television network, the central device 102 may be a set-top box configured to communicate with the television network. The central device 102 may also be a digital video recorder (DVR), a computer, a portable electronic device, such as a mobile phone or smart phone, or similar device. The central device 102 may be configured to communicate with the content provider 115 and one or more remote devices 110A, 1106. Remote devices 110A, 1106 can be similar to central device 102 or otherwise suitable devices that may be communicatively coupled to central device 102.

An illustrative example of remote device 110A or remote device 1106 is the Joey® set top box device available from DISH Network L.L.C. of Englewood, Colo. An illustrative example of central device 102 is the Hopper® set top box device available from DISH Network L.L.C. The disclosed technology is not limited to the Hopper/Joey environment, however, and equivalent concepts could be applied in any number of other products from any number of other suppliers. For example, in some embodiments, some or all of the central device and remote device functionality (e.g., DVR functionality) could be located remotely from a television receiver and/or television display, such as when a cloud-based video storage and DVR system communicates to a television receiver through the Internet. In at least one embodiment, the storage functionality may be provided by a network storage device accessible by the central device 102 and/or remote devices 110A and 1106.

In some embodiments, the central device 102 may include an application programming interface (API) configured to poll a wireless access point of the premises to monitor WiFi connectivity between the access point and its wireless client(s), e.g., remote devices 110A, 1106. If WiFi or other network connectivity is sufficient, the central device 102 may transmit content to remote devices 110A, 1106. Remote devices 110A, 1106 may then display the content to their associated presentation devices 104A, 104B respectively, providing a video stream to the user. In some instances, central device 102 "listens" for the wireless access point to automatically send status information regarding the wireless connection, without the need to specifically initiate a polling of the access point. Aside from receiving content, in some embodiments, a remote device can also access its device-specific folder on central device 102.

In accordance with disclosed embodiments, remote devices 110A, 1106 may request central device 102 to schedule a recording of content. Requests to schedule recording(s) of content may be user-generated, e.g., by user(s) operating remote devices 110A, 1106. Requests to schedule recordings(s) may also be supplied by the content provider.

In some embodiments, the requests corresponding to recording events may be stored in the form of a lineup or a list in central device 102. In some embodiments, the lineup or the list may be stored in device-specific folders inside central device 102. For example, central device 102 may generate device-specific folders for itself and for remote device 110A, 1106. In the environment shown in FIG. 1, central device 102 may generate three device-specific folders, one folder each for central device 102, remote device 110A, and remote device 1106. As more and more requests for recording events arrive at central device 102 from remote devices 110A, 1106, such recording events are added for storage into the device-specific-folder for the respective remote device. In some instances, central device 102 may also initiate (e.g., based on user inout) a request to schedule a recording of content. Such requests may be stored in a device-specific folder associated with central device 102. In some embodiments, the central device EPG is given different levels of access to the remote device EPGs.

In addition to the content, the central device 102 may receive content information that provides information about content including dates, times, and content providers 115. The central device 102 may use the content information to identify content that are available to be viewed and/or recorded at a particular time and date. The content information may be provided by the content provider 115, or from other data sources. The central device may display the content information on EPG 120 via presentation device 104. The central device may push the content information to remote devices 110A, 110B for display on their respective EPGs 120A, 120B via presentation devices 104A, 104B.

The presentation device 104 (or, presentation devices 104A, 104B) may be any device configured to receive the content in the form of an audio/video stream from the central device 102 (or, remote devices 110A, 110B) and present the audio/video stream to a user. Examples of the presentation devices may include a television, a video monitor, or similar device capable of presenting audio and video information to a user. The central device 102 (or, remote devices 110A, 110B) may be communicatively coupled to the presentation device 104 (or, presentation devices 104A, 104B) through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 (or, either of presentation device 104A, 104B) may be integrated with the central device 102 (or, remote devices 110A, 110B). For example, each of a computer or a portable electronic device may serve as both the central device 102 and the presentation device 104 by providing the capability of receiving content from the content provider 115, and presenting the received content to a user. In another implementation, a cable-ready television may include a converter device for receiving content from the content provider 115, and displaying the content to a user.

The discussions in connection with FIG. 1 showing a single central device and two remote devices are for illustrative purposes only. In alternate embodiments, there is no limitation on the number of remote devices and/or the number of central devices. Furthermore, there is no limitation on the number of presentation devices on the premises.

Figure 2:
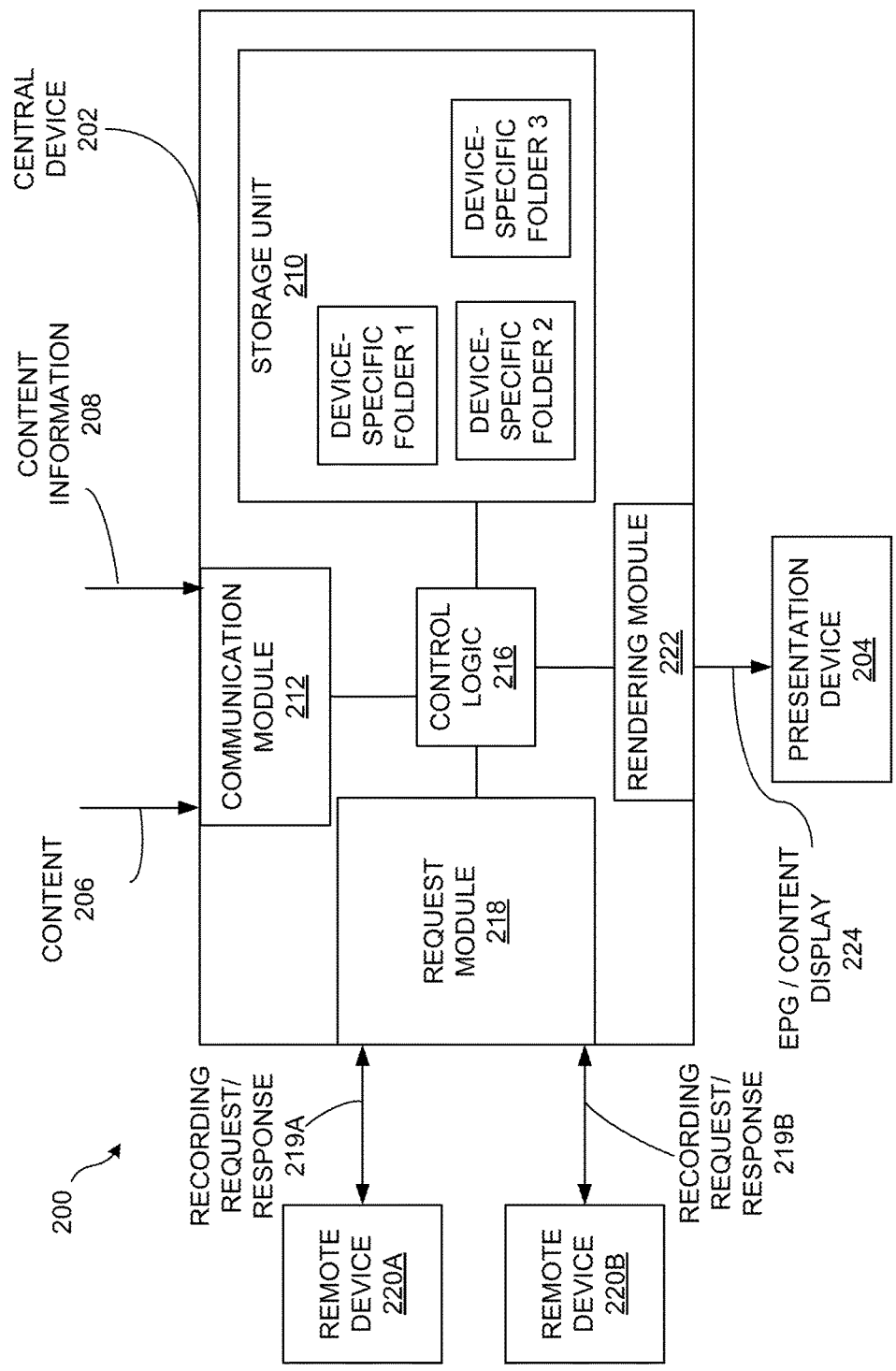
FIG. 2 illustrates an embodiment of a central device in a system 200 for facilitating delivery and recording of audio-visual content when the central device is associated with multiple remote devices.

FIG. 2 illustrates an embodiment of a central device in a system 200 for structuring the central device and/or its associated EPG in facilitating delivery and recording of audiovisual content when the central device is associated with multiple remote devices. A central device 202 may be an example of the central device 102 described in reference to FIG. 1. The central device 202 includes a request module 218, a communication module 212, control logic 216, a rendering module 222, and storage unit 210. The communication module 212 receives content information 206 and content information 208 from a content provider.

Request module 218 receives (wirelessly or via wired connections) recording requests 219A, 219B from remote devices 220A, 220B. Recording requests 219A, 219B may include event information corresponding to a recording event associated with scheduling a recording of content. Recording requests 219A, 219B may include information identifying the content requested to be recorded and/or information identifying remote devices 220A, 220B. Request module 218 passes along the recording requests 219A, 219B to control logic 216 for further processing.

The control logic 216 is operable to analyze the recording requests 219A, 219B to determine which device requested what content. Accordingly, the control logic 216 records the content at the date and time associated with the recording requests. In some cases, a content recording request may specify recording of recurring content, such as episodic content, the news or sporting events. In some embodiments, the control logic 216 generates device-specific folders (in storage unit 210 coupled to the control logic 216) for saving the lineup of the recordings. In the example in FIG. 2, the device-specific folders are denoted as device-specific folder 1 (for central device 202), device-specific folder 2 (for remote device 220A), and device-specific folder 3 (for remote device 220B). In some embodiments, if two or more devices requests the same content to be recorded, the lineup/list for the recordings are indicated in individual device-specific folders, but a single copy of the content recording is made. In some embodiments, the device-specific folders of the remote devices may be logically separate from one another and also from the device-specific folder of the central device such that a remote device is only allowed access to its corresponding device-specific folder. In some embodiments, the device-specific folder of the central device (e.g., device-specific folder 1 in FIG. 2) may access the device-specific folders of the remote devices. Thus, according to disclosed embodiments, the device-specific folders are provided different access control rights based on whether the device-specific folder is a master (e.g., associated with a central device) or a slave (e.g., associated with a remote device). A master device-specific folder may access slave device-specific folders but slave device-specific folders may not access a master device-specific folder. Also, a slave device-specific folder may not access other slave device-specific folders. The control logic 216 may receive content 206 and content information 208 from communication module 212 for generating an EPG. Further, the control logic 216 may coordinate the output of content or content information (e.g., on an EPG) to the rendering module 222. The control logic may also receive user inputs/requests/instructions, e.g., via user interface icons on the EPG received via a remote control operated by a user interacting with the EPG. For example, the user input may command the central device 202 to record, replay, delete, or render content. The control logic 216 may then instruct the communication module 212 to tune to the particular broadcast channel carrying the content. Upon determining a match between a current time and the time of the recording event, the control logic 216 may record the content corresponding to the recording event. In some implementations, recording by the central device 202 prevents recording the content by remote devices 220A, 220B.

The rendering module 222 may render the content or the EPG for display on presentation device 204. The rendering module 222 renders the audiovisual event and outputs an audio/video stream to the presentation device 204. Although FIG. 2 shows the device-specific folders as being physically separate, such an illustration is for discussion purposes only. In alternate embodiments, one or more device-specific folders may overlap.

One or more storage units 210 may be coupled (e.g., included internal and/or external) to the central device 202. The storage unit 210 may store the device-specific folders for the central device 202 and the remote devices 220A, 220B, in addition to the content. Furthermore, the central device 202 and system 200 may include other components, modules, elements, or devices not illustrated for the sake of brevity.

FIG. 3 illustrates an example central device EPG 302 generated by a central device connected to multiple remote devices. A user operating family room device 304 (shown in FIG. 3 as an example) interacts with EPG 302. This EPG may, for example, show recordings scheduled on the central device by the central device and/or by the connected multiple remote devices. For example, in FIG. 3, an EPG 302 shows a central device (identified on EPG 302 as family room device 304) is connected to remote devices (identified on EPG 302 as bed room 1 device 306, bed room 2 device 308, and bed room 3 device 310). EPG 302 shows a tab-separated layout in which individual devices are shown in respective tabs of EPG 302. Each tab represents a lineup of recordings associated with a device. EPG 302 also shows dates, times, and devices/content names for scheduled recordings. For example, family room device 304 has requested a lineup of recordings for content named "King Arthur" and "Superbowl." King Arthur is scheduled for broadcast on Dec. 25, 2017 at 5:00 pm. Superbowl is scheduled for broadcast on Feb. 5, 2018 AT 6 pm. Bed room device 1 306 has requested content recording of content named CSI and Superbowl. Bed room device 2 308 has requested content recording of content named "CSI." CSI is scheduled to be broadcast on Sep. 3, 2017 at 9:30 pm. Thus, FIG. 3 demonstrates that two or more devices may request recording of the same content.

In some embodiments, the content and/or timers (for recording content) are only stored in memory/storage unit coupled to the central device, and not in the remote devices. Thus, if a user operating family room device 304 provides a delete instruction via central device EPG 302 to delete the Superbowl content or an associated timer, then both the metadata for Superbowl content and the Superbowl content are deleted from the central device. However, if a user operating bed room 1 device provides a delete instruction via its respective remote device EPG to delete the Superbowl content (but no deletion instruction is given by a user operating family room device 304), then the metadata associated with the bed room 1 device gets deleted, but the metadata associated with family room device 304 and the Superbowl content is not deleted (e.g., retained in the storage unit included in the family room device 304). If a user operating bed room 1 device 306 provides a delete instruction (routed via its own EPG and bed room 1 device 306 to the family room device 304) but no deletion instruction is given by a user operating bed room device 2 308, then the family room device 304 prompts a user operating family room device 304 for selecting deletion of the content (e.g., CSI). Based on the response provided by the user operating family room device 304, the family room device 304 deletes (or, doesn't delete) the metadata and the associated content (e.g., CSI).

In some cases, timers set by devices 304, 306, 308, 310 may cause a resource conflict on the central device. For example, family room device 304 (i.e., central device in this example) may include three tuners, capable of simultaneously receiving three different programs. Any of the received programs can be either recorded and/or viewed live on devices 304, 306, 308, and 310. In accordance with at least one embodiment herein, a user of a device (e.g., any of devices 304, 306, 308, or 310) is able to modify a timer set by the device, but is restricted from modifying and/or skipping timers set by other devices. For example, if family room device 304 sets a timer, then only family room device 304 is able to modify/skip its timer. As another example, if bed room 1 device 306 sets a timer, then only bed room 1 device 306 is able to modify/skip its timer. Thus, a user of a device may be unable to delete a timer set by another device in favor of recording or live-playing its own content.

For example, a user of family room device 304 may have previously set a timer to record Big Bang Theory at 7 PM. A user of bed room 1 device 306 may have previously set a time to record Gotham at the same time, and a user of bed room 2 device 308 may have set a timer to record Supernatural at the same time. Since three different programs will be recorded at the same time, the family room device 304 will not have additional tuners (e.g., resource) to assign. This can be interpreted as a "conflict." If user of bed room 1 device 306 tries to set a timer for "A Charlie Brown Christmas" at 7 PM, the user will be unable to delete and/or modify the timers for Big Bang Theory and Supernatural. This is because timers for Big Bang Theory and Supernatural were set by other devices. One way of resolving the conflict is to let the user of bed room 1 device 306 either modify its timer for Gotham, or alternatively, not set a timer for A Charlie Brown Christmas. In some embodiments, features of the conflict resolution and providing various options to the user are handled by device-specific folders.

In at least one embodiment, the conflict resolution can be handled similarly if the user was tuning into a program live. For example, if user of bed room 1 device 306 tried to watch live "A Charlie Brown Christmas" at 7 PM, the same logic described above would be applicable.

In FIG. 3, the bedroom 1 device is shown in bold to indicate that a user interacting with central device EPG 302 has selected to view/edit the lineup/list associated with bedroom device 1 306. According to disclosed embodiments, central device EPG 302 provides a user the option to view/edit the lineup/list of recordings associated with family room device 304, bed room 1 device 306, bed room 2 device 308, or bed room 3 device 310. FIG. 3 also shows an example of a programming event 322 associated with family room device 304. Programming events (e.g., corresponding to recording events) may be related to pre-recorded content, content that is contemporaneously recorded, or content scheduled to be recorded in future. When the date and time of the recording event matches with the current time, the family room device 304 records the content corresponding to the recording event. Programming events, such as programming event 322 in FIG. 3, are stored in device-specific folders generated by the central device. In some embodiments, the device-specific folders for remote devices are logically separated from one another in a manner such that a remote device is restricted access to its own/corresponding device-specific folder. However, a central device may access the device-specific folders of remote devices. Hence, a user interacting with EPG 302 may view the programming events for family room device 304 as well as programming events associated with bed room 1 device 306, bed room 2 device 308, and bed room 3 device 310. Furthermore, in accordance with disclosed embodiments, a user interacting with bed room 1 device 306, bed room 2 device 308, or bed room 3 device 310 may only view the programming events for the respective device but is unable to view programming events of the other devices. For example, a user interacting with bed room 2 device 308 may only view its own programming events but may not view the programming events of any of family room device 304, bed room 1 device 306, or bed room 3 device 310. In accordance with the disclosed technology, columns 324, 326, 328, and 330 on central device EPG 302 are visually illustrative of the feature that the device-specific folders for the central device and the remote devices are logically separated from one another. Further, central device EPG 302 also demonstrates that the metadata requested by family room device 304, bed room 1 device 306, and bed room 2 device 308 are pairwise mutually separated. In some embodiments, EPG 302 may include an icon 312 (e.g., in the form of a drop-down menu) to filter the lineup based on a name of a device (e.g., any of a central device or a remote device).

Figure 4:
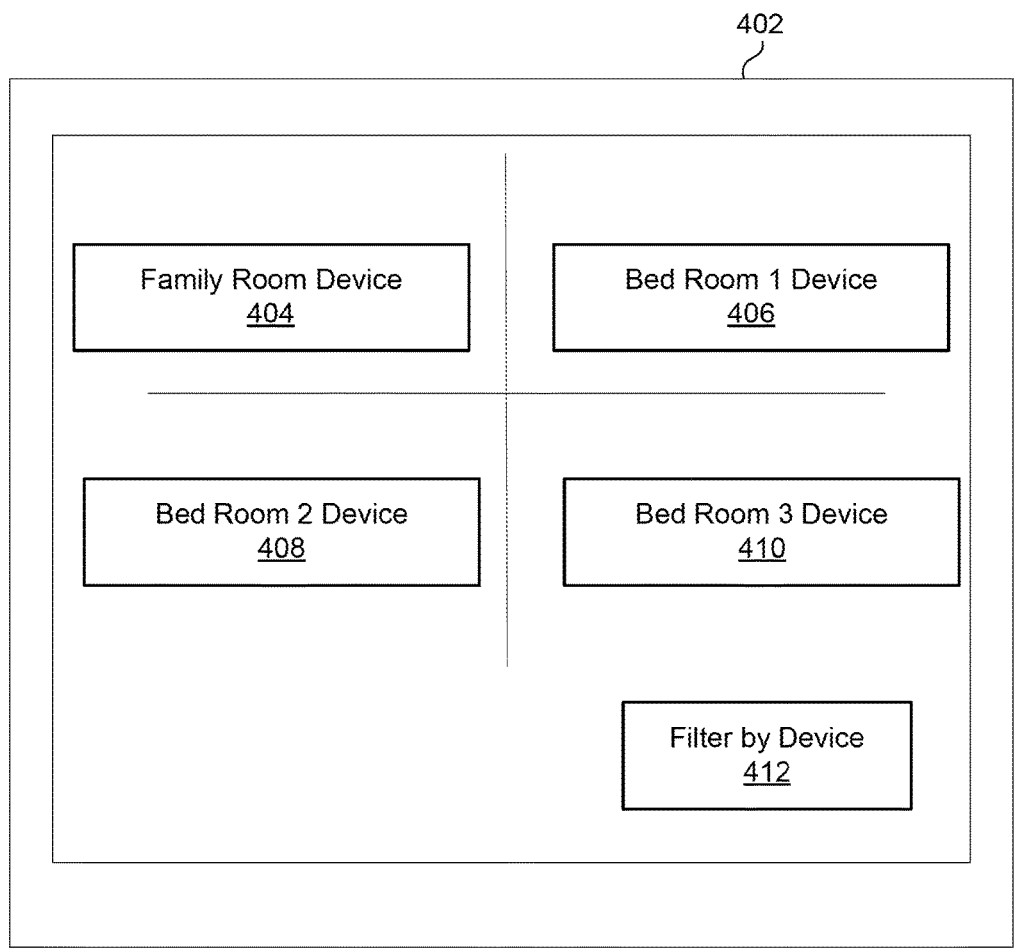
FIG. 4 illustrates another example of a central device EPG generated by a central device.

FIG. 4 illustrates an example central device EPG generated by a central device connected to multiple remote devices. A user operating family room device 404 (shown in FIG. 4 as an example) interacts with central device EPG 402. In FIG. 4, central device EPG 402 shows a grid layout of four device-specific folders. The device-specific folders are identified by the names/locations of the respective devices, central device (identified in EPG 402 as family room device 404) and connected remote devices (identified in EPG 402 as bed room 1 device 406, bed room 2 device 408, and bed room 3 device 410). Each panel of the grid layout corresponds to a device-specific folder which includes the lineup of recording events or requests. In some embodiments, EPG 402 may include an icon 412 (e.g., in the form of a drop-down menu) to filter the lineup based on a name of a device (e.g., any of a central device or a remote device). When a user clicks on icon 412, the user interface reveals a drop-down to select a device of the four devices by its name. Upon receiving a selection of the name of the device via icon 412, EPG 402 retains display of the device-specific folder corresponding to the name of the device and wipes out or removes the display of other device-specific folders.

Figure 5:
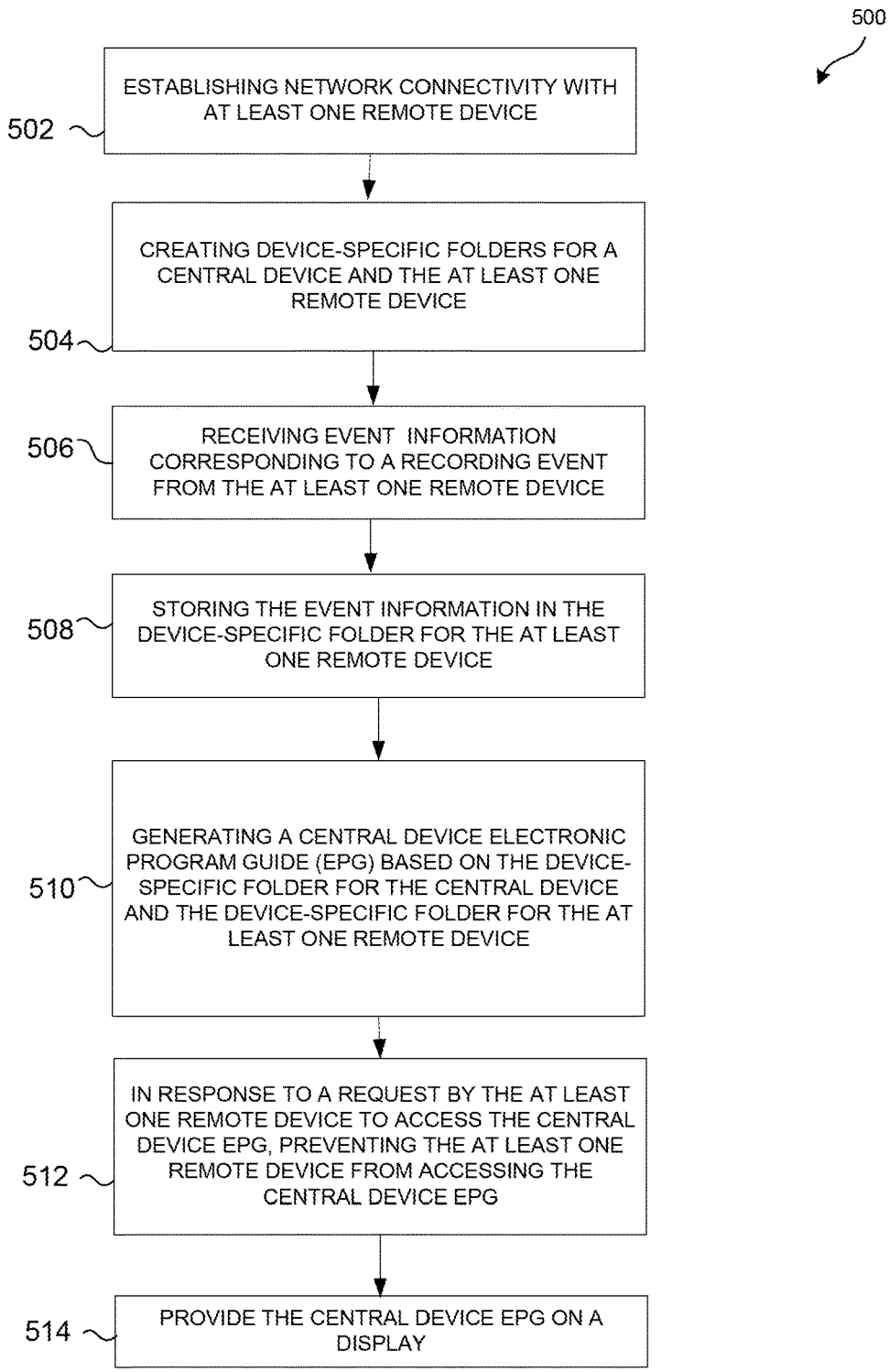
FIG. 5 illustrates an embodiment of a process for generating a central device EPG by a central device.

FIG. 5 illustrates an embodiment of a process 500 of generating a central device EPG for a central device. The operations of FIG. 5 are discussed in reference to the remote devices and central devices described in reference to FIGS. 1-4. The operations of the process 500 of FIG. 5 are not all-inclusive, and may comprise additional operations described herein, and/or other operations not illustrated for the sake of brevity.

In one implementation, the process 500 begins with the central device establishing (step 502) network connectivity with a remote device coupled to the central device. The connectivity may be established wirelessly or via a wired network. At step 504, the process 500 creates (in a storage unit coupled to the central device) device-specific folders for the central device and the remote device. The device-specific folders may include information for one or more programming events. In some embodiments, the device-specific folders for one or more remote devices are logically separated such that a remote device is restricted access only to its corresponding device-specific folder. A remote device (or, the central device) may request for scheduling a recording of content. The process 500 receives (at step 506) event information corresponding to a recording event from the at least one remote device, such that the event includes scheduling information for recording of content corresponding to the recording event. At step 508, the process 500 stores the event information corresponding to the recording event into the device-specific-folder for the remote device. At step 510, the process 500 generates a central device EPG based on the device-specific folder for the central device and the device-specific folders for one or more remote devices. In some embodiments, the process 500 prevents (at step 512) the remote device from accessing the central device EPG, in response to a request from the remote device to access the central device EPG. At step 514, the process 500 provides the EPG for display on a monitor coupled to the central device. In some implementations, the logically separated device-specific folders on the central device are configured to: (i) provide, to the central device EPG, remote access of the remote EPG without retrieval of the remote device EPG, (ii) provide, to the central device EPG, retrieval of the remote device EPG without remote access to the remote device EPG; or (iii) indicate availability of an option to either remotely access the remote device EPG or an option to retrieve the remote device EPG. The process 500 exits thereafter.

Figure 6:
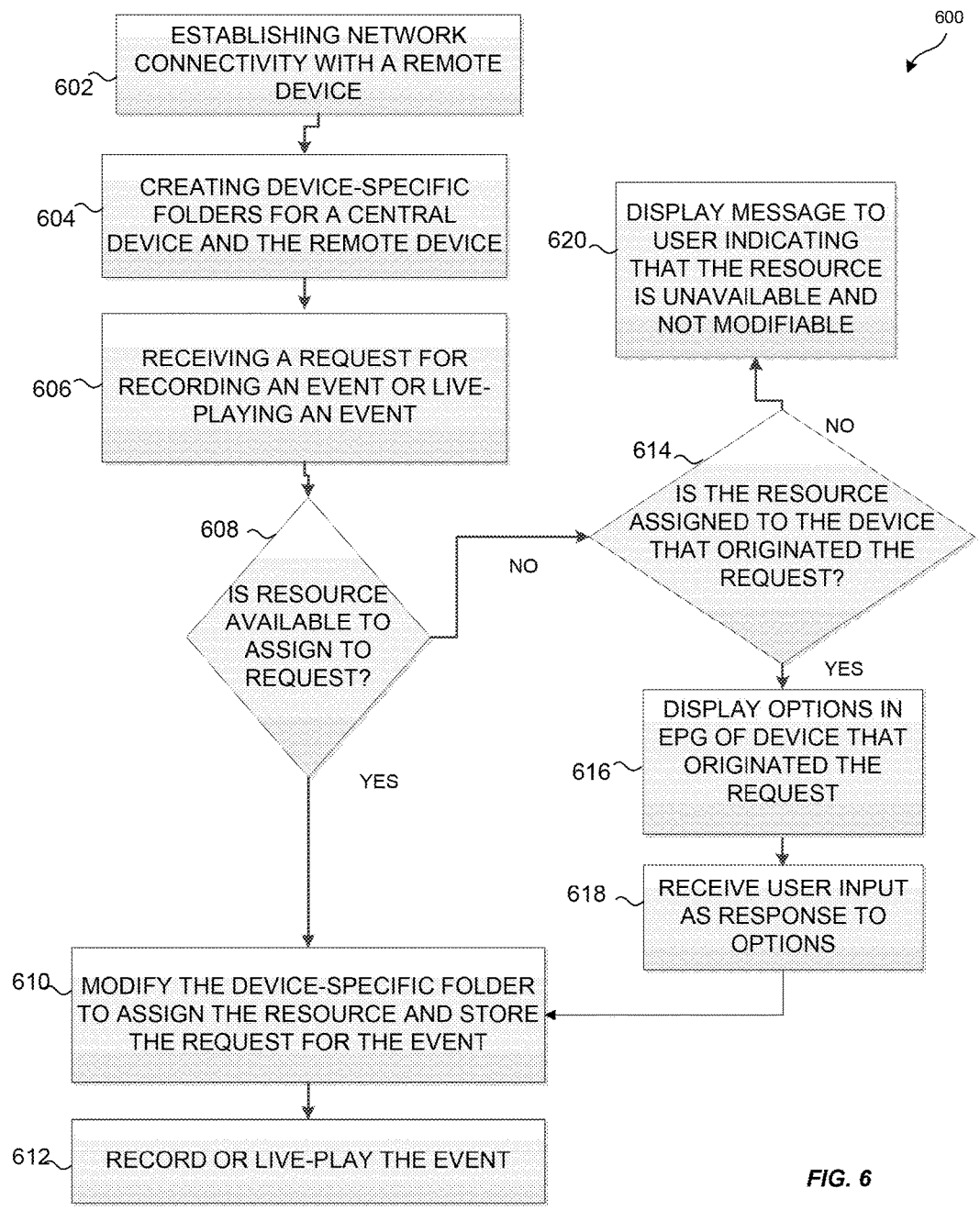
FIG. 6 illustrates an embodiment of a process for resolving conflicts associated with use of a resource on a central device.

FIG. 6 illustrates an embodiment of a central device process for resolving conflicts associated with use of a resource (e.g., a tuner) on a central device. Typically, the number of tuners available on a central device is fixed. The central device is configured to assign a resource for live-playing or recording an event. At step 602, the process establishes network connectivity with at least one remote device. At step 604, the process creates (e.g., in a storage unit communicatively coupled to the central device) device-specific folders for the central device and the at least one remote device. In some embodiments, each of the device-specific folders include information for one or more programming events, wherein the device-specific folders are logically separated such that the at least one remote device is restricted to modifying only the device-specific folder for the remote device. At step 606, the process receives a request corresponding to an event from a device, the event being a live-playing event or a recording event. According to disclosed embodiments, there is no restriction on the device that originates the request. That is, the device requesting the event can be the central device or the at least one remote device. At step 608, the process identifies whether the resource is available or not available. Upon determining that the resource is not available, the process determines (step 614) whether the resource is assigned to the device that originated the request. Upon determining (step 614) that the resource is not assigned to the device that originated the request, the process displays (step 620) a message to the user indicating that the resource is unavailable and not modifiable.

However, upon determining (step 614) that the resource is assigned to the device that originated the request, the process generates an electronic program guide (EPG) using the device-specific folder for the device. At step 616, the process displays options to: (i) delete the request or (ii) dissociate the resource from the event and assign the resource to the request. At step 618, the process receives user input corresponding to option (i) or (ii). Accordingly, at step 610, the process modifies the device-specific folder of the device, based on the user's selection of option (i) or (ii) and stores the request for the event. At step 612, the process records or live-plays the event, based on the request received in step 606. Upon determining (step 608) that the resource is available, the process resumes to steps 610 and 612 as shown in FIG. 6, and described above. The process exits thereafter.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of operating a central device that is communicatively coupled to at least one remote device for delivery of content, comprising:

establishing network connectivity with the at least one remote device;

creating, in a storage unit communicatively coupled to the central device, device-specific folders for the central device and the at least one remote device, wherein each of the device-specific folders include information for one or more programming events, wherein the device-specific folders are logically separated such that the at least one remote device is restricted to accessing only the device-specific folder for the at least one remote device;

receiving event information corresponding to a recording event from the at least one remote device, wherein the information includes event information for recording content corresponding to the recording event;

storing the event information in the device-specific-folder for the at least one remote device;

generating a central device electronic program guide (EPG) based on the device-specific folder for the central device and the device-specific folder for the at least one remote device, wherein the device-specific folder for the at least one remote device is associated with a remote device EPG, wherein the central device EPG includes (i) first metadata for a first content associated with the device-specific folder for the central device and (ii) second metadata for a second content associated with the device-specific folder for the at least one remote device, and wherein the first metadata and the second metadata are visually separated on the central device EPG;

in response to a request by the at least one remote device to access the central device EPG, preventing, by the central device, the at least one remote device from accessing the central device EPG; and providing the central device EPG on a display communicatively coupled to the central device.

2. The method of claim 1, wherein the event information corresponding to the recording event includes at least one of: pre-recorded content, content that is contemporaneously recorded, or content scheduled to be recorded in future.

3. The method of claim 1, wherein the event information corresponding to the recording event includes a time of the recording event, further comprising:

upon determining, by the central device, a correspondence between a current time and the time of the recording event, recording content corresponding to the recording event, wherein recording the content by the central device prevents recording the content by the at least one remote device.

4. The method of claim 1, wherein the central device EPG includes a grid layout of the device-specific folders, wherein each panel of the grid layout corresponds to a device-specific folder included in the device-specific folders.

5. The method of claim 4, wherein the central device EPG includes a user interface icon to filter the device-specific folders based on a name of a device, further comprising:

upon receiving a selection of the name of the device via the user interface icon:

retaining, on the central device EPG, display of the device-specific folder corresponding to the name of the device and removing, from the central device EPG, display of other device-specific folders.

6. The method of claim 1, wherein the central device EPG includes separate tabs corresponding to each device-specific folder.

7. The method of claim 1, wherein the first content associated with the device-specific folder for the central device is same as the second content associated with the device-specific folder for the at least one remote device.

8. The method of claim 7, further comprising:

in response to at least one deletion instruction from a user of the central device, deleting, from the central device EPG, the first metadata associated with the central device and the second metadata associated with the at least one remote device; and deleting the content from the storage unit communicatively coupled to the central device.

9. The method of claim 7, further comprising:

in response to at least one deletion instruction from a user of the at least one remote device and no deletion instruction from a user of the central device:

deleting, from the central device EPG, the second metadata associated with the at least one remote device; and retaining the first metadata and the content in the storage unit communicatively coupled to the central device.

10. The method of claim 1, wherein the device-specific folders for the at least one remote device includes a first device-specific folder associated with a first remote device and a second device-specific folder associated with a second remote device, wherein the central device EPG includes (i) third metadata for a content associated with the first device-specific folder and (ii) fourth metadata for the same content associated with the second device-specific folder, wherein the first metadata and the second metadata are visually separated on the central device EPG.

11. The method of claim 10, further comprising:

in response to a deletion instruction from a user of the first remote device and no deletion instruction from a user of the second remote device:

prompting a user of the central device for selecting deletion of the content; and deleting, based on a response from the user, the first metadata associated with the first remote device or the second metadata associated with the second remote device from the central device EPG.

12. The method of claim 1, wherein the device-specific folders for the at least one remote device include a first device-specific folder associated with a first remote device and a second device-specific folder associated with a second remote device, further comprising:

receiving, at the central device, a request from the first remote device for access to the second device-specific folder; and preventing, by the central device, the first remote device from access to the second device-specific folder.

13. The method of claim 1, wherein the recording event is a first recording event, the at least one remote device is a first remote device and a second remote device, further comprising:

receiving information corresponding to the first recording event from the first remote device, wherein the information includes event information for recording content corresponding to the first recording event;

receiving information corresponding to a second recording event from the second remote device, wherein the information includes event information for recording content corresponding to the second recording event;

upon determining a correspondence between a current time and the time of the first recording event, recording, by the central device, the content included in the information corresponding to the first recording event or the second recording event, wherein recording by the central device prevents recording the content by the first remote device or the second remote device, wherein the central device records a single copy of the content.

14. A system with multiple communicatively coupled content-processing devices for delivery of content, comprising:

a central device including one or more processors, wherein the central device is configured for assigning a resource for live-playing or recording an event, and wherein the central device is further configured for:

establishing network connectivity with at least one remote device;

creating, in a storage unit communicatively coupled to the central device, device-specific folders for the central device and the at least one remote device, wherein each of the device-specific folders include information for one or more programming events, wherein the device-specific folders are logically separated such that the at least one remote device is restricted to modifying only the device-specific folder for the at least one remote device;

receiving a request corresponding to an event from a device, wherein the event is a live-playing event or a recording event, wherein the device is the central device or the at least one remote device;

identifying whether the resource is available or not available;

upon determining that the resource is not available:

determining whether the resource is assigned to the device that originated the request;

responsive to determining that the resource is assigned to the device that originated the request:

generating an electronic program guide (EPG) using the device-specific folder for the device, wherein the device-specific folder displays options to:

(i) delete the request or (ii) dissociate the resource from the event and assign the resource to the request;

modifying the device-specific folder of the device, responsive to selection of option (i) or (ii) by the user; and storing the request for the event.

15. The system of claim 14, wherein the central device is further configured for:

responsive to determining that the resource is not assigned to the device that originated the request, displaying a message to user indicating that the resource is unavailable and not modifiable.

16. The system of claim 14, wherein the central device is further configured for:

upon determining that the resource is available:

modifying the device-specific folder of the device to assign the resource to the request; and storing the request for the event.

17. A non-transitory computer-readable storage medium storing instructions configured to cause a central device communicatively coupled to at least one remote device for delivery of content to perform a method comprising:

establishing network connectivity with at least one remote device;

creating, in a storage unit communicatively coupled to the central device, device-specific folders for the central device and the at least one remote device, wherein each of the device-specific folders include information for one or more programming events, wherein the device-specific folders are logically separated such that the at least one remote device is restricted to accessing only the device-specific folder for the at least one remote device;

receiving event information corresponding to a recording event from the at least one remote device, wherein the information includes event information for recording content corresponding to the recording event;

storing the event information in the device-specific-folder for the at least one remote device;

generating a central device electronic program guide (EPG) based on the device-specific folder for the central device and the device-specific folder for the at least one remote device, wherein the device-specific folder for the at least one remote device is associated with a remote device EPG, wherein the device-specific folders for the at least one remote device includes a first device-specific folder associated with a first remote device and a second device-specific folder associated with a second remote device, wherein the central device EPG includes (i) first metadata for a content associated with the first device-specific folder and (ii) second metadata for the same content associated with the second device-specific folder, and wherein the first metadata and the second metadata are visually separated on the central device EPG;

in response to a request by the at least one remote device to access the central device EPG, preventing, by the central device, the at least one remote device from accessing the central device EPG; and providing the central device EPG on a display communicatively coupled to the central device.

18. The computer-readable medium of claim 17, wherein the event information corresponding to the recording event includes at least one of: pre-recorded content, content that is contemporaneously recorded, content scheduled to be recorded in future.

19. The computer-readable medium of claim 17, wherein the event information corresponding to the recording event includes a time of the recording event, further comprising:

upon determining, by the central device, a correspondence between a current time and the time of the recording event, recording content corresponding to the recording event, wherein recording the content by the central device prevents recording the content by the at least one remote device.

20. The method of claim 1, wherein the logically separated device-specific folders on the central device are configured to:

(i) provide, to the central device EPG, access of the at least one remote device EPG without modification of the at least one remote device EPG; and (ii) provide, to the central device EPG, access and modification of the central device EPG.

21. The computer-readable medium of claim 17, further comprising:
in response to a deletion instruction from a user of the first remote device and no deletion instruction from a user of the second remote device:
prompting a user of the central device for selecting deletion of the content; and
deleting, based on a response from the user, the first metadata associated with the first remote device or the second metadata associated with the second remote device from the central device EPG.

* * * * *